United States Patent
Knapp et al.

(10) Patent No.: US 8,074,546 B1
(45) Date of Patent: *Dec. 13, 2011

(54) PYROTECHNIC DROP MECHANISM FOR POWER TOOLS

(75) Inventors: William R. Knapp, Salinas, CA (US); Jean-Pierre Krauer, San Jose, CA (US); Wilfred H. Anderson, Los Gatos, CA (US); Kyle L. Petrich, New York, NY (US); Jeffrey Y. Hayashida, San Jose, CA (US); Helen J. Yoo, San Francisco, CA (US)

(73) Assignee: Power Tool Institute, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/623,694

(22) Filed: Nov. 23, 2009

Related U.S. Application Data

(63) Continuation of application No. 11/589,344, filed on Oct. 30, 2006, now Pat. No. 7,628,101, which is a continuation of application No. 11/374,319, filed on Mar. 13, 2006, now abandoned.

(60) Provisional application No. 60/660,788, filed on Mar. 11, 2005.

(51) Int. Cl.
*B27B 5/29* (2006.01)

(52) U.S. Cl. ......... 83/62.1; 83/58; 83/471.3; 83/DIG. 1; 83/477.2

(58) Field of Classification Search ............ 83/62.1, 83/58, 471.2, 581, 478, 490, DIG. 1, 663, 83/477.2, 781; 144/384, 391, 427, 154.5, 144/356; 307/326, 116, 328; 324/688, 661; 318/16, 480; 340/686.5, 686.6, 532

See application file for complete search history.

(56) References Cited

U.S. PATENT DOCUMENTS

| | | | |
|---|---|---|---|
| 4,962,685 A * | 10/1990 | Hagstrom | ............... 83/397 |
| 6,227,563 B1 | 5/2001 | Talisman | |
| 6,813,983 B2 | 11/2004 | Gass et al. | |
| 6,834,730 B2 | 12/2004 | Gass et al. | |
| 6,857,345 B2 | 2/2005 | Gass et al. | |
| 6,920,814 B2 | 7/2005 | Gass et al. | |
| 6,922,153 B2 | 7/2005 | Pierga et al. | |
| 6,945,149 B2 | 9/2005 | Gass et al. | |
| 6,994,004 B2 | 2/2006 | Gass et al. | |
| 6,997,090 B2 | 2/2006 | Gass et al. | |

(Continued)

FOREIGN PATENT DOCUMENTS

DE 19609771 A1 6/1998

*Primary Examiner* — Ghassem Alie

(74) *Attorney, Agent, or Firm* — K&L Gates LLP

(57) ABSTRACT

A saw includes a surface defining an opening therein, a plate structure configured to be attached to the saw below the surface, and an arm attached to the plate structure about a first shaft. A blade is configured to be engaged with the arm at a location spaced from the first shaft. The blade extends through the opening when the saw is in a normal operating position. The saw includes a firing mechanism including a barrel end portion having a bore defined therein and an extendable piston at least partially positioned within the bore. The barrel end portion is attached to the plate structure. The extendable piston engages the arm during its extension and causes the arm to pivot about the first shaft when the firing mechanism is activated by an activation signal. The pivoting of the arm causes the blade to be moved downwardly below the surface.

21 Claims, 7 Drawing Sheets

U.S. PATENT DOCUMENTS

| | | |
|---|---|---|
| 7,024,975 B2 | 4/2006 | Gass et al. |
| 7,077,039 B2 | 7/2006 | Gass et al. |
| 7,098,800 B2 | 8/2006 | Gass |
| 7,100,483 B2 | 9/2006 | Gass et al. |
| 7,121,358 B2 | 10/2006 | Gass et al. |
| 7,197,969 B2 | 4/2007 | Gass et al. |
| 7,210,383 B2 | 5/2007 | Gass et al. |
| 7,225,712 B2 | 6/2007 | Gass et al. |
| 7,228,772 B2 | 6/2007 | Gass |
| 7,231,856 B2 | 6/2007 | Gass et al. |
| 7,284,467 B2 | 10/2007 | Gass et al. |
| 7,290,474 B2 | 11/2007 | Keller |
| 7,308,843 B2 | 12/2007 | Gass et al. |
| 7,350,444 B2 | 4/2008 | Gass et al. |
| 7,350,445 B2 | 4/2008 | Gass et al. |
| 7,357,056 B2 | 4/2008 | Gass et al. |
| 7,359,174 B2 | 4/2008 | Gass |
| 7,421,315 B2 | 9/2008 | Gass et al. |
| 7,481,140 B2 | 1/2009 | Gass et al. |
| 7,628,101 B1 * | 12/2009 | Knapp et al. .................. 83/62.1 |
| 2002/0017181 A1 | 2/2002 | Gass et al. |
| 2002/0020261 A1 | 2/2002 | Gass et al. |
| 2002/0020262 A1 | 2/2002 | Gass et al. |
| 2002/0020263 A1 | 2/2002 | Gass et al. |
| 2002/0069734 A1 | 6/2002 | Gass et al. |
| 2002/0170399 A1 | 11/2002 | Gass et al. |
| 2003/0005588 A1 | 1/2003 | Gass et al. |
| 2003/0020336 A1 | 1/2003 | Gass et al. |
| 2003/0037651 A1 | 2/2003 | Gass et al. |
| 2003/0131703 A1 | 7/2003 | Gass et al. |
| 2003/0140749 A1 | 7/2003 | Gass et al. |
| 2004/0159198 A1 | 8/2004 | Peot et al. |
| 2004/0173430 A1 | 9/2004 | Gass |
| 2005/0041359 A1 | 2/2005 | Gass |
| 2005/0066784 A1 | 3/2005 | Gass |
| 2005/0139057 A1 | 6/2005 | Gass et al. |
| 2005/0139058 A1 | 6/2005 | Gass et al. |
| 2005/0155473 A1 | 7/2005 | Gass |
| 2005/0166736 A1 | 8/2005 | Gass et al. |
| 2005/0268767 A1 | 12/2005 | Pierga et al. |
| 2006/0101960 A1 | 5/2006 | Smith et al. |
| 2006/0123960 A1 | 6/2006 | Gass et al. |
| 2006/0123964 A1 | 6/2006 | Gass et al. |
| 2006/0179983 A1 | 8/2006 | Gass et al. |
| 2006/0225551 A1 | 10/2006 | Gass |
| 2006/0247795 A1 | 11/2006 | Gass et al. |
| 2006/0254401 A1 | 11/2006 | Gass et al. |
| 2007/0028733 A1 | 2/2007 | Gass |
| 2007/0186737 A1 | 8/2007 | Gass et al. |
| 2007/0199622 A1 | 8/2007 | Gass et al. |
| 2007/0240786 A1 | 10/2007 | Gass et al. |
| 2008/0016998 A1 | 1/2008 | Keller |
| 2008/0029184 A1 | 2/2008 | Gass |
| 2008/0041204 A1 | 2/2008 | Gass |
| 2008/0092702 A1 | 4/2008 | Gass et al. |

* cited by examiner

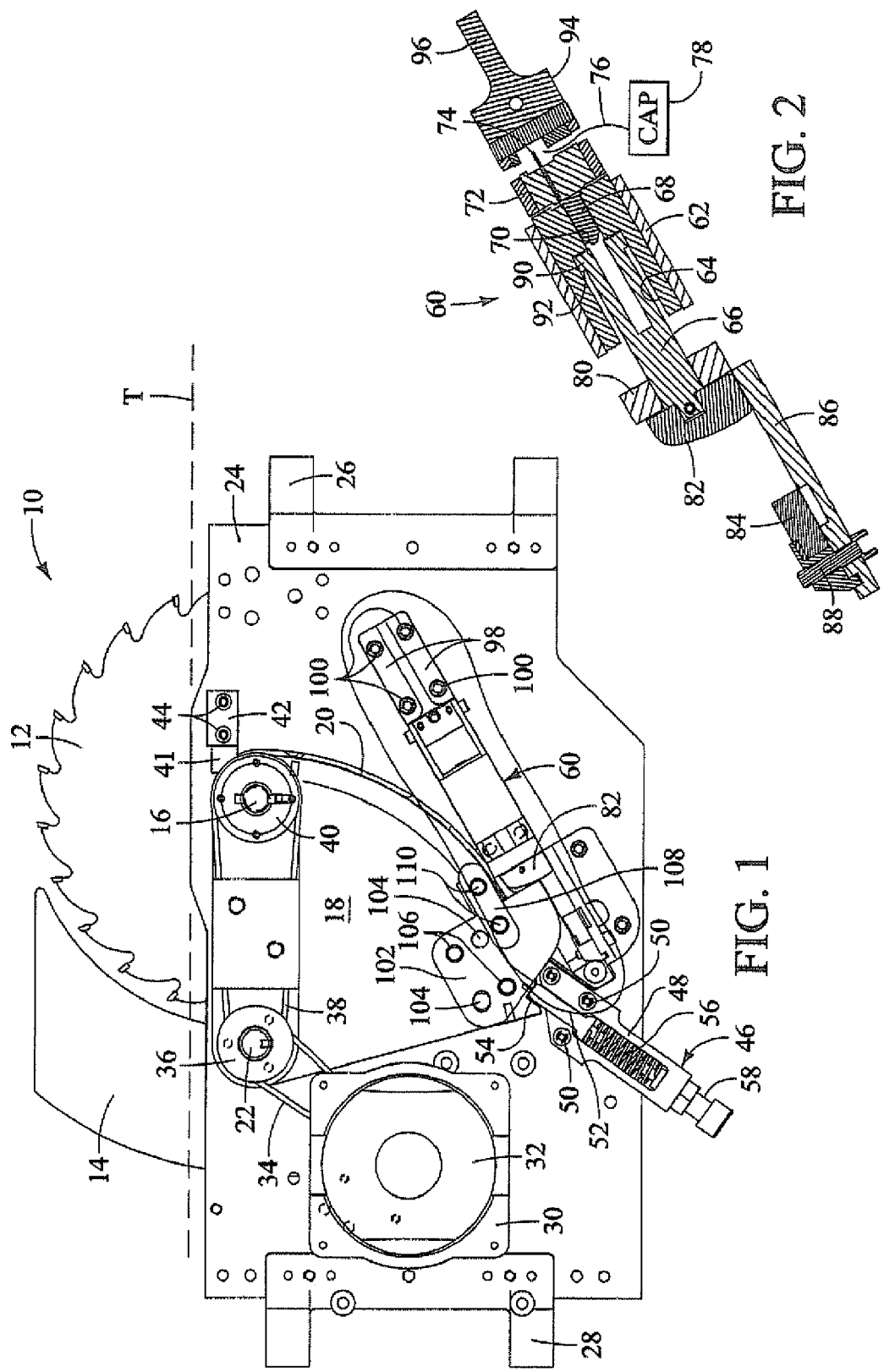

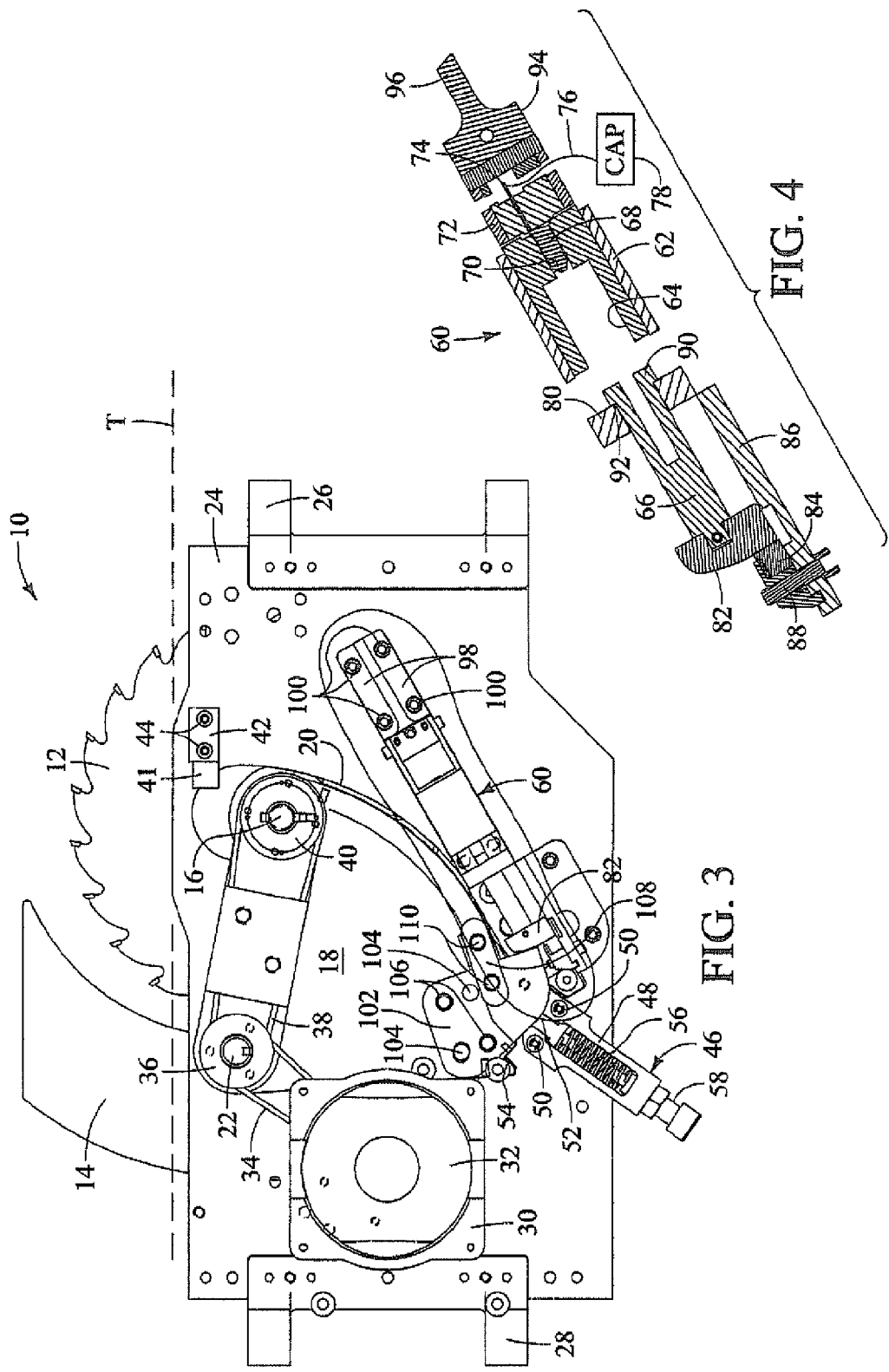

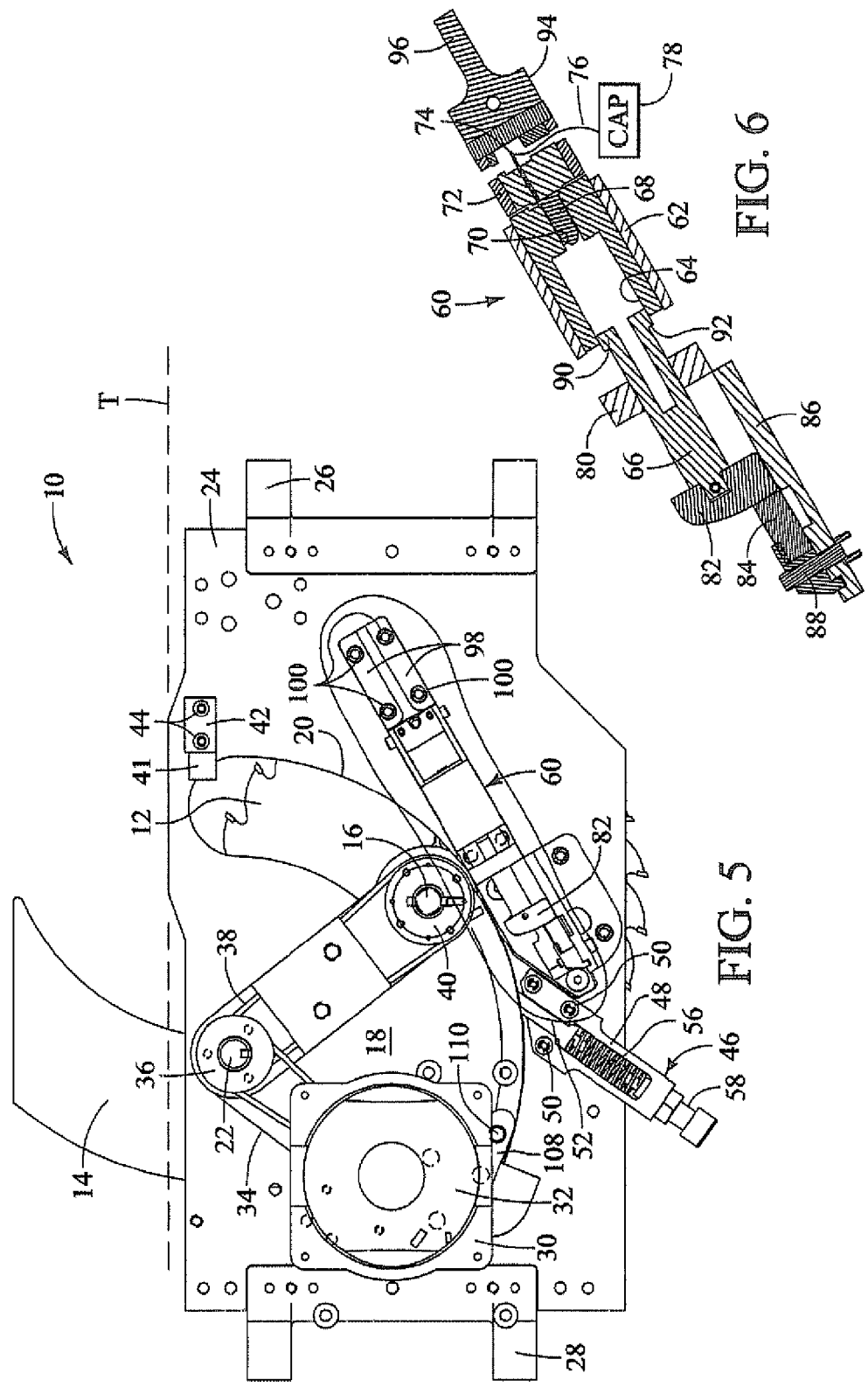

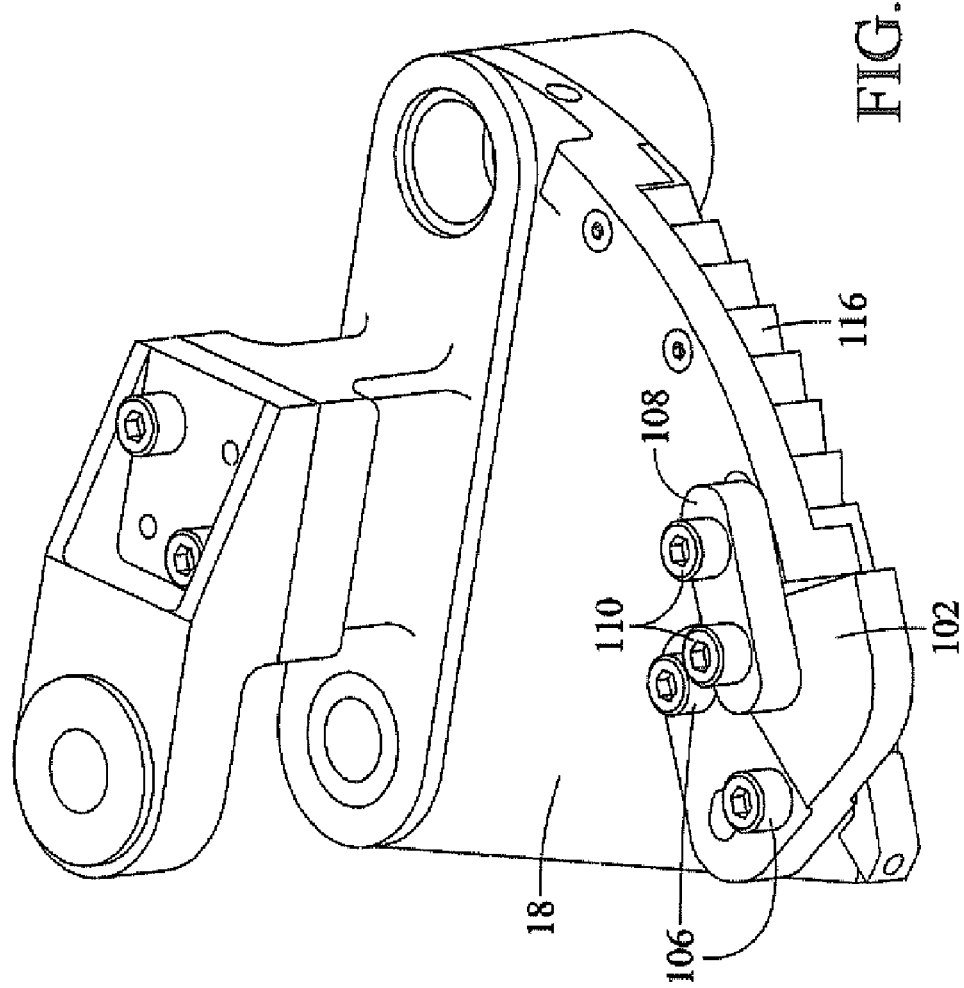

PYROTECHNIC DROP MECHANISM FOR POWER TOOLS

CROSS REFERENCE TO RELATED APPLICATIONS

This application is a continuation of, and hereby claims priority under 35 U.S.C. §120 to, U.S. patent application Ser. No. 11/589,344, filed Oct. 30, 2006 now U.S. Pat. No. 7,628, 101, by William R. Knapp et al., entitled PYROTECHNIC DROP MECHANISM FOR POWER TOOLS, which is a continuation of, and claims priority under 35 U.S.C. §120 to, U.S. patent application Ser. No. 11/374,319, filed Mar. 13, 2006 now abandoned, by William R. Knapp et al., entitled PYROTECHNIC DROP MECHANISM FOR POWER TOOLS, which claims priority under 35 U.S.C. §119(e) to, U.S. Provisional Patent Application Ser. No. 60/660,788, filed Mar. 11, 2005, by William R. Knapp et al., entitled PYROTECHNIC DROP MECHANISM FOR POWER TOOLS.

BACKGROUND OF THE INVENTION

The present invention generally relates to power tools and to blade dropping systems for such power tools.

Systems have been developed and are described in a plurality of patent applications that are assigned to SD2, LLC which include various mechanisms that have a detection system for detecting contact between a human and a blade The detection system triggers a brake mechanism that typically includes a pawl structure that is urged into the blade by a biasing mechanism that is retained by a fusible member and is melted by a high energy electrical current. Severing the fusible member releases the pawl to stop the blade or to retract it below the work surface of a table saw, for example. The systems have disadvantages; for example they are expensive and inconvenient to use since they require the replacement of expensive modules after they have been fired, which is time-consuming and difficult. An additional disadvantage is the variability of the system based on the blade design.

SUMMARY OF THE INVENTION

Embodiments of a saw are disclosed of the type which has a top with an opening in the top through which a saw blade can extend, the height and angular orientation of which can be adjusted, and also configured to be retracted in response to an activation signal being applied, the saw comprising a plate structure configured to be mounted to the saw below the top, an arm pivotally mounted to the plate structure about a first shaft, a rotatable circular blade having an arbor mounted to the arm at a location spaced from the first shaft, and being configured so that at least a portion of the blade can extend through the top opening and be in position to cut a work piece when the blade is in its normal operating position, a drive motor with an output shaft operatively connected to power the saw blade, a firing mechanism having a barrel end portion with a cylindrical bore mounted to the plate structure and an extendable piston positioned in the bore, the piston engaging the arm during its extension and causing the arm to pivot about the first shaft when the firing mechanism is activated by the activation signal being applied, the pivoting of the arm causing the blade to be moved downwardly below the saw top toward its retracted position.

DESCRIPTION OF THE DRAWINGS

FIG. 1 is a side view of a preferred embodiment of the blade retracting mechanism, showing the blade in the normal operating position;

FIG. 2 is a cross section of a portion of the apparatus shown in FIG. 1, particularly illustrating the pyrotechnic firing mechanism;

FIG. 3 is a side view of the apparatus shown in FIG. 1, but illustrating the saw blade in a partially retracted position;

FIG. 4 is a view similar to FIG. 2, but showing the firing mechanism immediately after firing when the piston is at the extent of its travel;

FIG. 5 is a side view of the apparatus shown in FIG. 1, but illustrating the saw blade in a fully retracted position;

FIG. 6 is a view similar to FIG. 2, but showing the firing mechanism after firing but with the piston reacting back to its post firing resetting position;

FIG. 10 is a similar perspective view of a portion of the apparatus shown in FIG. 9 illustrating portions of the mechanism that were hidden from view in FIG. 9.

DETAILED DESCRIPTION

Figure 7:
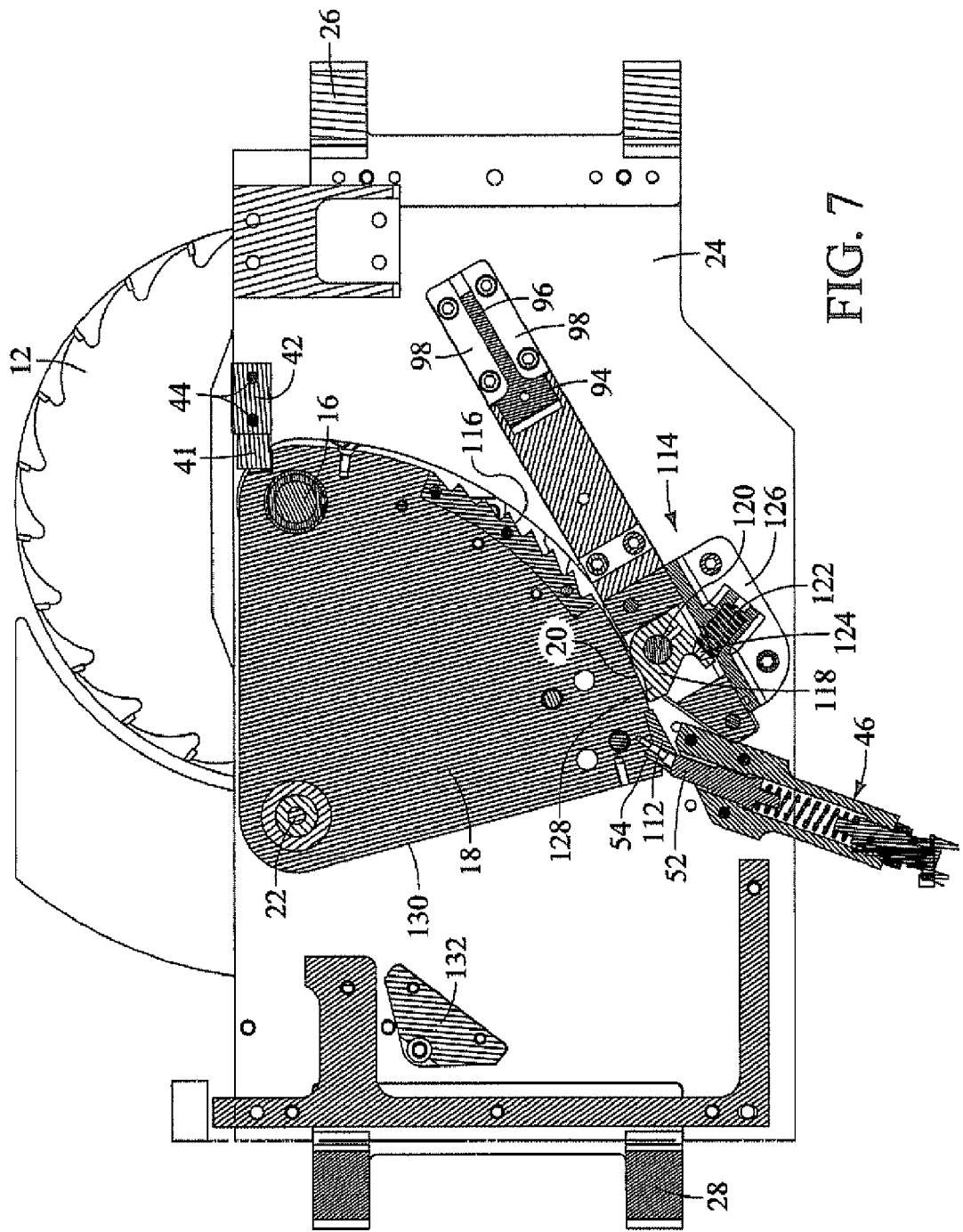
FIG. 7 is a side view of a portion of a second embodiment of the blade retracting mechanism and is shown with the blade in a normal operating position.

The preferred embodiments of the blade retracting mechanism that are shown and described herein are operable with a detection system that is designed and configured to be able to detect the presence of a person either by use of a mechanism that detects the proximity of a person's hand or possibly by virtue of detection of contact of a person's body with a portion of the saw or other tool that is designed to be a sensor. The most likely component to be used as a sensor is the saw blade, which would be used to detect the person's proximity or contact with a saw blade. If contact with a saw blade is necessary for detection, there would necessarily be at least some injury to a user depending upon the speed of approach and the speed in which the entire system operates.

The preferred embodiment of the present invention is shown in FIGS. 1-6, with FIG. 1 showing a side view of a blade retracting mechanism indicated generally at 10, with the blade 12 being in a normal operating position, where the blade is near a riving knife 14. In FIG. 3, the blade 12 is shown to be partially retracted as would occur during operation of the mechanism 10 and in FIG. 5, the blade 12 is fully retracted below the surface of the table saw top which is approximately at the elevation shown by the dotted line T of FIGS. 1, 3 and 5. The blade 12 rotates on a shaft 16 that is journaled in a generally triangularly shaped arm 18 that has a curved lower surface 20. The arm 18 rotates around another shaft 22 that is attached to a large plate 24 that is mounted to the saw by mounting brackets 26 and 28 located on opposite ends of the plate 24. The plate 24 carries a motor base 30 that is mounted above the elevation of the plate 24 and carries a motor 32 for driving the saw blade 12.

The output shaft of the motor 32 is not shown, but it carries a pulley which drives a belt 34 and a pulley 36, with the pulley 36 being connected to another pulley or having an extension for driving a belt 38 and in turn drives a pulley 40 that is operatively connected by the shaft 16 to an arbor (not shown), but which drives the blade 12. Since the arm 18 is pivotable about the shaft 22, it should be understood that the motor 32 is configured to be able to drive the belts 34 and 38 via the motor pulley and pulley 36 regardless of the vertical position of the blade 12. Stated in other words, the distance between pulleys 36 and 40 remains constant as does the distance between pulley 36 and the motor drive shaft regardless of the vertical position of the blade 12.

When the blade is in the normal operating position as shown in FIG. 1, the top right surface of the arm 18 abuts against a stop member 41 that is mounted to the plate 24 by a mounting bracket 42 with bolts 44. The arm 18 is held in the upper position as shown in FIG. 1 by a detent assembly, indicated generally at 46, that comprises a main bracket 48 that is bolted to the plate 24 by bolts 50 and wherein a detent rod 52 engages a V-shaped recess 54. The rod 52 is biased into engagement with the recess 54 by a spring 56 that is seated on a bolt 58 and which is adjustable to vary the biasing force that is applied to the rod 52. The detent assembly 46 is therefore designed and configured to maintain the arm 18 in its normal operating position unless it is rotated downwardly with sufficient force to depress the detent rod 52 away from the V-shaped recess 54 and release the arm 18 for rotation.

The force that is necessary to overcome the detent assembly 46 is provided by a firing mechanism that is indicated generally at 60. A cross-section of the mechanism is shown in FIGS. 2, 4 and 6, and comprises a cylindrical barrel structure 62 having a cylindrical bore 64 in which a piston 66 is positioned. The mechanism 60 has a replaceable cartridge 68 that is placed in a smaller bore 70 with the cartridge 68 being retained by an end cap structure 72 through which a metal pin 74 is located with the pin extending to the cartridge 68 so that it can be fired. The pin 74 is connected to a wire 76 which in turn is connected to a capacitor 78.

During operation, the capacitor 78 is switched to release its electrical charge which travels through wire 76 to heat the pin 74 to a temperature that fires the cartridge 68 and this causes high pressure gases to be produced and cause the piston 66 to be moved to the left out of the bore 64. The piston 66 is guided by a support 80 having a cylindrical opening therein sized to receive the cylindrical piston 66. As it is driven in the leftward direction, i.e., away from the barrel 62, a hammer 82 is driven toward a hammer damper 84 that is mounted to a skid 86 that also has a mounting structure, indicated generally at 88, which holds the damper 84 and cushions the hammer 82. During its travel the hammer 82 drives the arm 18 in the clockwise direction around the shaft 22. The piston 66 has an enlarged end portion 90 that defines a shoulder 92 that engages the support member 80 at the end of its travel. It should also be understood that the skid 86 and support member 80 are effectively connected together. An end bracket 94 has a narrow center portion 96 that extends rearwardly and it is retained by a pair of support members 98 (FIG. 1) located on opposite sides of the center portion 96. The support members 98 are bolted to the plate 24 by bolts 100.

An anvil 102 is connected to the arm 18 by a pair of pins 104 and a pair of bolts 106 as well as by a strap 108 that is bolted on opposite ends to the anvil 102 and the arm 18. It should be apparent that the front surface of the hammer 82 is in contact with the adjoining surface of the anvil 102 so that when the firing mechanism 60 is activated, the piston 66 will cause the hammer 82 to move the anvil 102 and arm 18 in a clockwise direction so as to retract the blade 12 below the surface T before the user is seriously injured.

When the microprocessor triggers the pyrotechnic device, a high amperage current is sent through the wire 76 to the electrode or pin 74, which directs the current to the back of the cartridge 68. The cartridge 68 fires causing a rapid pressure rise in the barrel 62 behind the piston 66 that produces approximately 10,000 pounds of force that propels it toward the anvil 102. The piston 66 is forced to move along the barrel axis pushing the anvil 102 as it does so. This pushing force overrides the detent assembly 46 and the arm 18 rotates in a clockwise direction. When the arm 18 moves to its position of maximum travel as shown in FIG. 5, the hammer 82 fully compresses the hammer damper 84. In this position, the barrel 62 vents the combustion gases because the piston 66 moves past the end of the barrel 62 thus relieving the barrel pressure in preparation to stopping the piston 66. Since the arm 18 and hammer 82 are not physically connecting, i.e., they only touch, the arm 18 is free to continue rotating even though the piston 66 stops. The arm 18 continues to rotate until it contacts a mechanical stop that is not shown, at which time its movement ends. The hammer damper 84 then relaxes and pushes the hammer 82 and piston 66 back into the barrel 62. The cartridge 68 is a commonly available 22 caliber nail gun cartridge that is used in construction and costs about $0.05. An advantage of the preferred embodiments of the present invention is that once the cartridge 68 is fired, the end cap 72 can be removed enabling the spent cartridge shell to be removed. The firing mechanism 60 can be rearmed by placing another cartridge 68 in the bore 70, inserting another pin 74 in the end cap 72, connecting the wire 76 to the pin and recharging the capacitor 78.

In a second preferred embodiment shown in FIGS. 7-10, reference numbers that have been given to the first preferred embodiment shown in FIGS. 1-6 are used where the components are similar. In the embodiment shown in FIG. 7, the arm 18 has structure that interacts with a detent assembly 46 in a slightly different manner, i.e., the V-shape recess 54 is not directly contacted by the detent rod 52, but contains an extension piece 112 that extends beyond the curved surface 20 of the arm 18 and contacts the end of the detent rod 52 as shown.

This extension is necessary because of a slight modification to the placement of the detent assembly 46 to accommodate the addition of an anti-bounce mechanism, indicated generally at 114 that is located below the anvil 102. The outer surface 20 of the arm 18 has a number of serrated teeth 116 along a portion of the surface which are positioned to engage a ratchet assembly 118 that pivots about a shaft 120 that is operatively connected to the plate 24. A compression spring 122 has one end engaging an extension 124 of the ratchet assembly and the opposite end bearing against a bracket 126 so that a pawl 128 of the ratchet assembly 118 is biased toward the arm 18.

Figure 8:
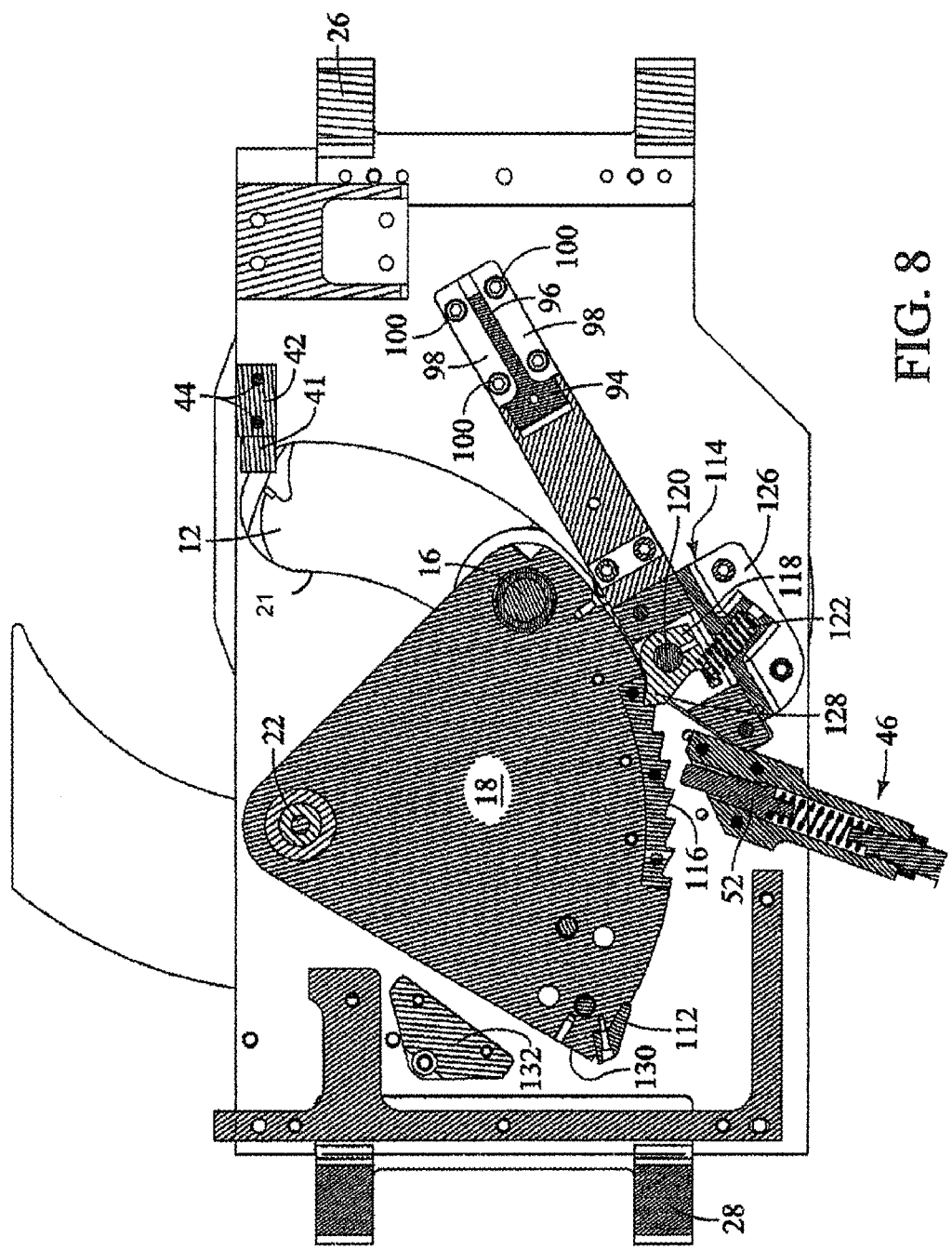
FIG. 8 is a view of the apparatus shown in FIG. 7, but illustrating the blade in a fully retracted position.
Figure 9:
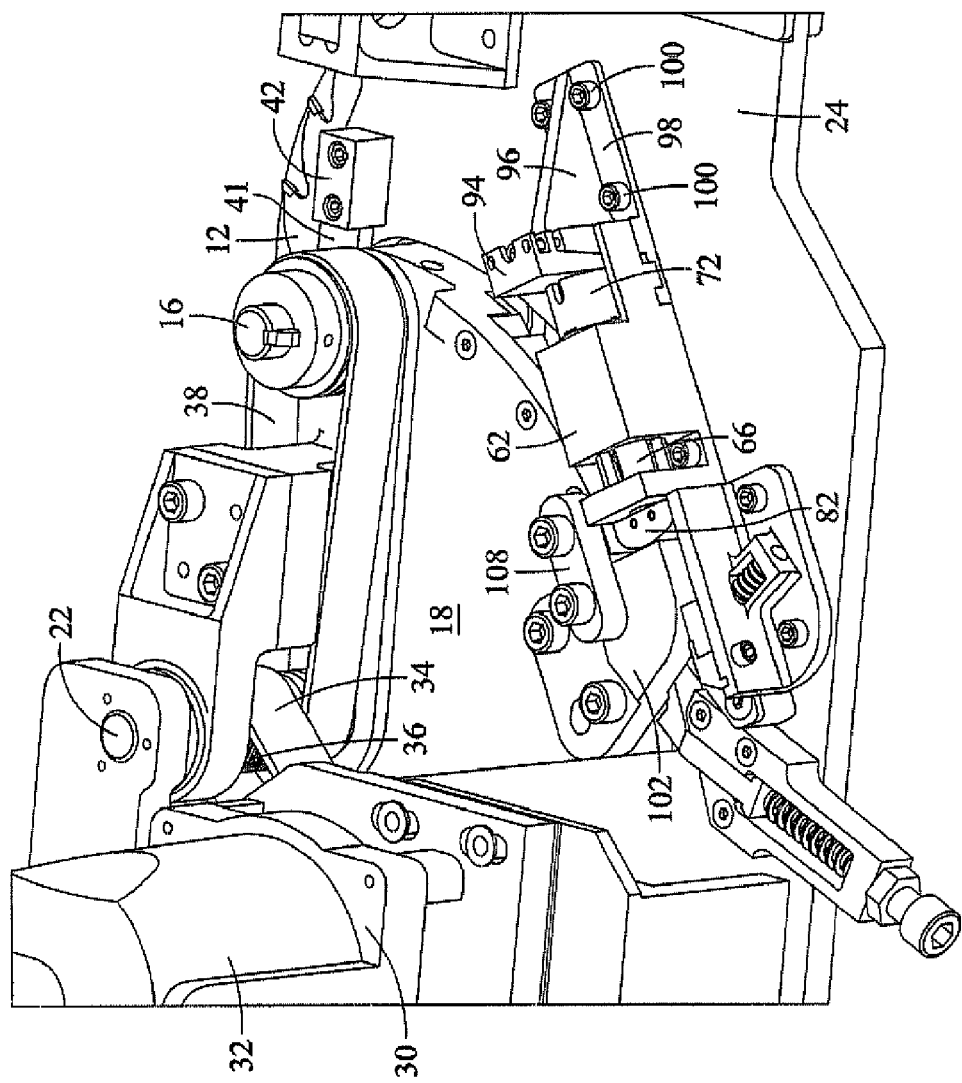
FIG. 9 is an idealized perspective view of a portion of the apparatus shown in FIG. 8, with the blade in its normal operating position.

As shown in FIG. 8, the saw blade 12 is mounted to the arm 18 through an aperture in the plate 24 by the shaft 16. The aperture in the plate comprises an arcuately-shaped track 21 such that when the arm 18 rotates clockwise about the shaft 22, the shaft 16 moves downwardly along the arcuately-shaped track 21. After the firing mechanism 60 rotates the arm 18 in a clockwise direction, its left surface 130 will contact a stop or damper 132. Because of the tremendous force having been applied to the arm 18, the arm 18 is moving rapidly and bounces off the stop 132. As show in FIG. 8, as the arm 18 bounces off of the stop 132, the pawl 128 will engage one of the teeth 116 and stop the counterclockwise movement of the arm 18 and prevent the blade 12 from moving upwardly above the tabletop to potentially strike the user. While not shown, a pull lever is preferably provided to release the pawl 128 from the teeth 116 as the arm 18 is returned to its normal operation position. While adjustable, it is preferred that the amount of force needed to release the pawl 128 be in the range of about 10 to about 20 pounds. The amount of force needed to lift the arm 18 to its normal operation position is within the range of about 10 to about 20 pounds and the amount of force to overcome the spring 56 in the detent assembly 46 to latch the arm 18 in the normal operating position is preferably within the range of about 15 to about 25 pounds.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. A table saw configured to retract a saw blade in response to an activation signal from a normal operating position, where the saw blade extends out of an opening in a table top of the table saw, into a retracted position, where the upper reach of the saw blade is positioned below the table top, the table saw comprising:
   a plate mounted to the table saw below the table top, wherein an arcuately-shaped track is defined in the plate;
   an arm pivotally mounted to the plate about a first shaft;
   a second shaft mounted to the arm at a location spaced a distance from the first shaft and extending into at least a portion of the arcuately-shaped track, wherein the second shaft comprises an arbor, and wherein the arbor is engagable with the saw blade;
   a detent assembly mounted to the plate and configured to releasably engage the arm to hold the arm in position when the saw blade is in the normal operating position; and
   a firing mechanism comprising:
      a barrel comprising a bore; and
      an extendable piston positioned at least partially within the bore, wherein the piston is configured to cause the arm to pivot about the first shaft when the firing mechanism is activated by the activation signal, wherein the pivoting of the arm overrides the detent assembly and causes the second shaft to move downwardly along the arcuately-shaped track, and wherein the downwardly movement of the second shaft along the arcuately-shaped track brings the saw blade below the table top into the retracted position.

2. The table saw as defined in claim 1 wherein the arm comprises an anvil portion mounted to a portion thereof, wherein the piston comprises a hammer mounted on a portion thereof, and wherein the hammer is configured to engage the anvil portion to pivot the arm about the first shaft through an arc sufficient to lower the saw blade below the table top into the retracted position.

3. The table saw as defined in claim 1 wherein the barrel comprises a removable end cap portion, wherein the barrel is mounted to the plate, wherein removal of the end cap portion reveals a small bore that is in communication with a larger bore in the barrel, wherein the small bore is configured to receive a pyrotechnic cartridge, and wherein the end cap portion is configured to accept a pin that is connectable to a power source for heating the pin to cause the cartridge to fire.

4. The table saw as defined in claim 1 wherein the piston comprises a hammer configured to engage and push the arm when the firing mechanism is activated by the activation signal, and wherein the pushing causes the arm to pivot about the first shaft and override the detent, thereby bringing the saw blade below the table top into the retracted position.

5. The table saw as defined in claim 1 wherein the arm comprises an arcuately-shaped outer surface, and wherein the arcuately-shaped outer surface of the arm comprises at least two teeth.

6. The table saw as defined in claim 5 comprising a ratchet assembly comprising a ratchet member that is biased toward the at least two teeth and configured to engage at least one of the at least two teeth to counter kick-back of the arm after activation of the firing mechanism.

7. The table saw as defined in claim 1 wherein the arm is configured to travel at least partially along the arcuately-shaped track when the saw blade is moved from the normal operating position into the retracted position.

8. The table saw as defined in claim 1 wherein the arm comprises a curved outer surface, wherein the curved outer surface comprises a plurality of teeth, wherein the table saw comprises a ratchet assembly comprising a ratchet member that is biased toward the plurality of teeth and configured to engage at least one of the plurality of teeth to counter kick-back of the arm after activation of the firing mechanism.

9. The table saw as defined in claim 1, wherein arm comprises a generally pie-shaped arm pivotally attached to the plate about a first shaft.

10. The table saw as defined in claim 9 wherein the arm comprises a curved outer surface, and wherein the curved outer surface defines an arc within the range of about 70 to about 90 degrees.

11. The table saw as defined in claim 9 wherein the arm is configured to travel at least partially along the arcuately-shaped track when the saw blade is moved below the working surface into the retracted position.

12. The table saw as defined in claim 9 wherein the firing mechanism comprises a barrel comprising a removable end cap portion, wherein the barrel defines a bore and is mounted to the plate, and wherein the piston is at least partially positionable within the bore when in the first unfired position.

13. The table saw as defined in claim 9 wherein the table saw comprises a detent assembly mounted to the plate and configured to releasably engage the arm to releasably hold the arm in position when the saw blade is in the normal operating position.

14. The table saw as defined in claim 9 wherein a face of the plate defines a generally horizontal plane, and wherein a direction of motion of the arm, when pivoting, is substantially parallel to the generally horizontal plane.

15. The table saw as defined in claim 9, wherein the arm comprises at least two teeth, and further comprising a ratchet assembly comprising a ratchet member biased toward the at least two teeth and configured to engage at least one of the at least two teeth to counter kick-back of the arm.

16. The table saw as defined in claim 1 wherein the piston is configured to be moved between a first unfired position, where the saw blade is in the normal operating position, and a second fired position, where the saw blade is moved into the retracted position below the table top, and wherein the piston is free from engagement with the arm in the first unfired position.

17. The table saw as defined in claim 16 wherein the piston comprises a hammer configured to engage and push the arm when the piston moves from the first unfired position to the second firing position, and wherein the pushing causes the arm to pivot about the first shaft and override the detent assembly.

18. The table saw as defined in claim 1 wherein the plate is disposed between the arm and the saw blade and wherein the arm engages the saw blade across the plate through an aperture in the plate.

19. The table saw as defined in claim 18 wherein the aperture comprises the arcuately-shaped track.

20. The table saw as defined in claim 19 wherein when the saw blade is brought below the table top into the retracted position, the saw blade moves downwardly along the arcuately-shaped track and adjacent to the point where the second shaft is mounted to the arm.

21. The table saw as defined in claim 1 wherein extension of the piston causes the arm to pivot about the first shaft when the firing mechanism is activated by the activation signal.

* * * * *